No. 652,259. Patented June 26, 1900.
W. GIBSON.
WATCHMAKER'S EYEGLASS.
(Application filed Mar. 23, 1900.)

(No Model.)

Witnesses
O. L. Johnson
A. M. Parkins.

Inventor
William Gibson,
By his Attorneys
Baldwin, Davidson & Wight

UNITED STATES PATENT OFFICE.

WILLIAM GIBSON, OF INGERSOLL, CANADA.

WATCHMAKER'S EYEGLASS.

SPECIFICATION forming part of Letters Patent No. 652,259, dated June 26, 1900.

Application filed March 23, 1900. Serial No. 9,916. (No model.)

*To all whom it may concern:*

Be it known that I, WILLIAM GIBSON, a subject of the Queen of Great Britain, residing at Ingersoll, in the Province of Ontario, Canada, have invented certain new and useful Improvements in Watchmakers' Eyeglasses, of which the following is a specification.

The primary object of my invention is to provide a watchmaker's eyeglass in which a skeleton frame is employed, with its parts so hinged together that it may be folded, and thus easily carried as a "vest-pocket" eyeglass.

In carrying out my invention I employ an annular frame or ring of proper size to encircle the eye and to be secured thereto in the usual way, and the lens is mounted in a frame of smaller size. Both of these frames are hinged to opposite ends of a connecting-frame which carries a spring that bears on the inner ends of the eye and lens frames and holds each of them in either its folded or open position.

My improvements are shown in the accompanying drawings, in which—

Figure 1:
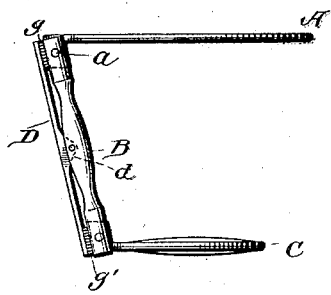
Figure 2:
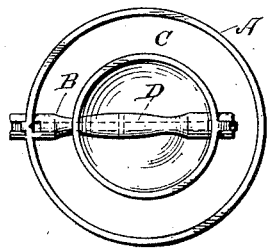
Figure 3:
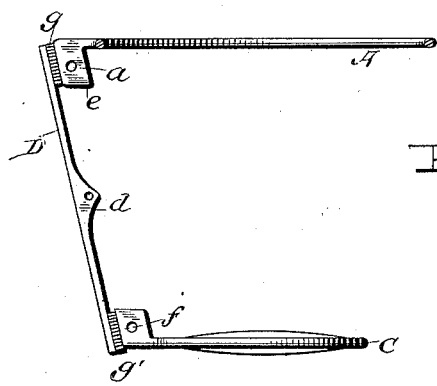

Figure 1 shows a side elevation of the eyeglass ready for use. Fig. 2 is a plan view thereof with the frames folded. Fig. 3 is a detail view showing particularly the manner of hinging the eye-frame and lens-frame to their connecting-frame and the manner in which the spring bears upon the frames.

The eye-frame A is hinged at *a* to one end of a connecting-frame B, while the lens-frame C is hinged to the opposite end thereof, the frames being so related as to bring the lens centrally under the eye-frame when the frames are open, as shown in Fig. 1, and so as to bring the lens and its frame within the eye-frame when the frames are closed or folded, as shown in Fig. 2. I employ a spring D, which bears on the inner ends of the eye and lens frames in such manner as to hold them securely in either their closed or open positions. Preferably the spring is of the form shown, being provided with a lug *d* midway between its ends, which is secured to the connecting-frame B, while the ends of the spring bear against lugs *e f* on the inner ends of the frames A and C. These lugs project inwardly toward each other, and the pivot-pins which secure the frames to the connecting-frame B pass through these lugs. The frame B is provided with slots or sockets at its ends and about midway between its ends, and the lugs *e, f,* and *d* are inserted in these sockets and attached thereto by pins or other devices, as clearly indicated in the drawings. Wearing-pieces *g g'* may be secured to the ends of the spring where they bear on the lugs. The lugs *e* and *f* are formed with two flat surfaces so related to the spring that each end of the spring bears on one of these surfaces when the frame is folded and against the other when the frame is open, and therefore each frame is held securely in either of these positions, and it will not accidentally move; but special force must be exerted to change its position. When both frames are folded, as shown in Fig. 2, the device occupies but small space and can be conveniently carried in the pocket. When in use, the lens is carried a proper distance from the eye in exact alinement with the center of the eye-frame. As the space between the eye-frame and the lens is open the eye of the user is not necessarily confined to the lens, but may turn from place to place to inspect objects not lying in the field of the lens.

The device not only possesses the advantages above mentioned, but the construction is simple and inexpensive.

I claim as my invention—

1. A watchmaker's eyeglass, comprising a circular eye-frame adapted to encircle the eye and to be held around the eye in the usual way, a lens-frame of smaller diameter than the eye-frame, a connecting-frame to which the eye-frame and lens-frame are hinged, a stop for limiting the outward movement of the eye-frame when opening, and a stop for causing the lens-frame to be arrested in its outward movement, and be arranged centrally in line with the center of the eye-frame.

2. A watchmaker's eyeglass, comprising an eye-frame, a lens-frame, a connecting-frame, devices for hinging the eye-frame to the connecting-frame, devices for hinging the lens-frame to the connecting-frame at such a distance from the hinge that connects the eye-frame to the connecting-frame, that when the two frames are folded the lens-frame may lie within the eye-frame, and both frames lie parallel with the connecting-frame.

3. A watchmaker's eyeglass, comprising a connecting-frame, an eye-frame and a lens-frame hinged to opposite ends of the connecting-frame and adapted to turn on their hinges and to lie parallel with the connecting-frame when folded with the lens-frame within the eye-frame, and devices for limiting the outward movement of the eye-frame and lens-frame and to hold said frames with the center of the lens-frame in line with the center of the eye-frame.

4. A watchmaker's eyeglass, comprising an eye-frame, a lens-frame, a connecting-frame to which they are hinged, and a spring secured at its middle portion to the connecting-frame and bearing at its opposite ends on the eye-frame and lens-frame and limiting the movements thereof when being opened or folded, and holding the lens-frame within the eye-frame parallel with the connecting-frame when the frames are folded, and also holding the center of the lens-frame in line with the center of the eye-frame when the two frames are open for use.

5. A watchmaker's eyeglass comprising an eye-frame, and a lens-frame each of which is provided with a lug having bearing-surfaces for a spring, a connecting-frame to which the eye-frame and lens-frame are hinged, and a spring secured to the connecting-frame and bearing on the lugs of the eye and lens frames.

In testimony whereof I have hereunto subscribed my name.

WM. GIBSON.

Witnesses:
 JNO. B. JACKSON,
 MILLE TOULL.